(12) United States Patent
Makita et al.

(10) Patent No.: US 7,488,925 B2
(45) Date of Patent: Feb. 10, 2009

(54) LIGHT CONTROL APPARATUS HAVING A DEVICE FOR CONTROLLING THE INPUT SIGNAL LIGHT OF AN OPTICAL TRANSMISSION PATH

(75) Inventors: Kikuo Makita, Tokyo (JP); Toshitaka Torikai, Tokyo (JP)

(73) Assignee: NEC Corporation, Tokyo (JP)

(*) Notice: Subject to any disclaimer, the term of this patent is extended or adjusted under 35 U.S.C. 154(b) by 58 days.

(21) Appl. No.: 10/579,499

(22) PCT Filed: Nov. 17, 2004

(86) PCT No.: PCT/JP2004/017062

§ 371 (c)(1),
(2), (4) Date: May 16, 2006

(87) PCT Pub. No.: WO2005/047964

PCT Pub. Date: May 26, 2005

(65) Prior Publication Data

US 2007/0086076 A1   Apr. 19, 2007

(30) Foreign Application Priority Data

Nov. 17, 2003   (JP) .............................. 2003-387108

(51) Int. Cl.
*H01J 40/14* (2006.01)
(52) U.S. Cl. ...................... 250/206; 250/221; 250/214 R
(58) Field of Classification Search ................ 250/206, 250/214 R, 214 D, 221, 222.1, 214 DC; 359/330, 359/341.3
See application file for complete search history.

(56) References Cited

U.S. PATENT DOCUMENTS

| 5,086,329 | A  | * | 2/1992  | Newman .................... 257/482 |
| 7,049,574 | B1 | * | 5/2006  | Takeuchi ................ 250/214 R |
| 7,148,469 | B2 | * | 12/2006 | Pearson ................. 250/227.12 |
| 2002/0141021 | A1 | | 10/2002 | Wyatt et al. |

FOREIGN PATENT DOCUMENTS

| JP | 57-155503 | 9/1982 |
| JP | 62-80614  | 4/1987 |
| JP | 4-328510  | 11/1992 |
| JP | 5-297331  | 11/1993 |
| JP | 6-34894   | 2/1994 |
| JP | 7-15093   | 1/1995 |

(Continued)

*Primary Examiner*—Kevin Pyo
(74) *Attorney, Agent, or Firm*—Young & Thompson

(57) ABSTRACT

A light control apparatus includes a part for splitting an input light entering the light control apparatus through an optical fiber, a photoelectric conversion part for converting a monitor light into an electrical signal, and a third part for controlling the opening and closing of an optical transmission path for a signal light based on the electrical signal. The light power of an output light is controlled by the opening and closing amount of the optical transmission path which is controlled depending on the amount of the electrical signal output in accordance with the level of the monitor light. A semiconductor photovoltaic device capable of performing photoelectric conversion without using an external power source is used as the photoelectric conversion part. An optical shutter using a micromachine, or an optical device such as absorption-type modulator or refractive index-type modulator is used as the third part.

16 Claims, 6 Drawing Sheets

FOREIGN PATENT DOCUMENTS

| | | |
|---|---|---|
| JP | 8-37499 | 2/1996 |
| JP | 9-247093 | 9/1997 |
| JP | 11-274547 | 10/1999 |
| JP | 11-281842 | 10/1999 |
| JP | 2000-216424 | 8/2000 |
| JP | 2003-270559 | 9/2003 |

* cited by examiner

LIGHT CONTROL APPARATUS HAVING A DEVICE FOR CONTROLLING THE INPUT SIGNAL LIGHT OF AN OPTICAL TRANSMISSION PATH

TECHNICAL FIELD

The present invention relates to a light control apparatus that controls the opening and closing degree of an optical transmission path in a variable manner.

BACKGROUND ART

In recent years, a high-sensitivity optical communication technique that uses an optical fiber amplifier doped with a rare-earth element to directly amplify an optical signal has been adopted in a long-distance and large capacity optical communication system. In such a system, a transmission optical signal is excited by excitation lights having different wavelengths and caused induced emission to thereby obtain an amplified transmission optical signal. It is known that energy accumulated in the optical fiber amplifier is rapidly emitted in an inductive manner to generate a high-intensity light pulse (surge light) when a signal light is suddenly inputted from the optical fiber amplifier or outputted to the optical fiber amplifier in the optical amplification process. This phenomenon occurs at the signal switching time in a multiple-wavelength transmission or the like, unintended instantaneous interruption of a light signal, or the like. When such a high-intensity light pulse (surge light) is transmitted, optical components mounted in a next stage light apparatus may be degraded or destroyed.

In a recent broadband environment represented by a Fiber To The Home (FTTH), where a light signal is distributed to individual homes, an unintended high power input light may be transmitted from the transmission side (station side) in some cases. This phenomenon easily occurs at, for example, system maintenance time. Additionally, there is a possibility that the high power input light is reversely transmitted from the reception side (customer side) to destroy optical components on the transmission side intentionally. In such a background, a countermeasure for protecting a light device from a surge light or high power input light becomes important.

A fiber-type optical fuse and the like have been proposed as an apparatus that performs operation for protecting an optical apparatus from such a surge light or high power input light. The fiber-type optical fuse uses fiber fuse phenomenon as its fundamental principle. For example, a light-absorbing material or the like is applied to a part of a waveguide area or the diameter of a fiber core is intentionally made to change in a discontinuous manner. Consequently, heat is generated by local absorption or dissipation to thereby allow the fiber core area to undergo fusion or evaporation. With this configuration, a propagating light can be scattered or cut off.

FIG. 11 is a configuration example of a fiber-type optical fuse disclosed in U.S. Patent Application Publication No. 2002-0141021 A1. An input light 115 passing through an optical fiber 111 is amplified through an excitation light source 113 and a fiber amplifier 112. A tapered-type fiber 114 is connected to the output side of the optical fiber 111. A guiding light is dispersed due to a difference in core shape in the tapered-type fiber 114, so that the tapered-type fiber 114 is weak to a high power output light.

With this feature, thermal destruction occurs in the tapered-type fiber 114 area in association with generation of a surge light or the like, so that it is possible to reduce the power of an output light 116.

FIG. 12 is a configuration example of a fiber-type optical fuse disclosed in JPA-11-281842. In this example, a medium 123 comprising a heat-sensitive and heat-metamorphic material and a light-pyrogenic material is provided between optical fibers 121 in a chassis 122. The heat-sensitive and heat-metamorphic material layer has optical transparency and generates heat in accordance with the intensity of an input light 124. Thermal destruction occurs when the optical power exceeds a predetermined level to scatter or cut off a propagating light, thereby reducing a power of an output light 125. Optical fuse operation is thus realized.

FIG. 13 is a configuration example of a fiber-type optical fuse disclosed in JPA-11-274547. The operation principle of this example is the same as that used in the example disclosed in JPA-11-281842. That is, a film body 132 whose transmittance and reflectance is irreversibly changed depending on the optical power of an input light 135 passing through an optical fiber 131 is provided in the middle of an optical transmission path. Heat deterioration due to generation of heat occurs when the optical power exceeds a predetermined level to reduce the transmittance, thereby reducing the power of an output light 136. Optical fuse operation is thus realized.

In this example, a monitor device 133 and a power source and determination circuit 134 quantitatively monitor the degree of the deterioration of the film body 132 by monitoring the intensity of a reflection light.

DISCLOSURE OF INVENTION

Problems to be Solved by the Invention

A light control apparatus and optical fuse apparatus are required to be "small", "using no power source", "low power consumption", "low loss" and the like so as to be capable of being directly connected to an optical communication device. Optical devices used in an optical communication device are often destroyed or deteriorated at mW level. It is known, for example, that in a PIN-PD or an Avalanche Photodiode (APD) serving as a photoelectric conversion device, heat damage occurs in the light receiving surface thereof by the input of light having several mW level to destroy the optical devices.

Therefore, an optical fuse is required to operate on a wide power range from the power of a light pulse (surge light level) of W level caused by an optical fiber amplifier to that of an input light of several mW level.

However, in the fiber-type optical fuse disclosed in U.S. Patent Application Publication No. 20020141021 A1, it is necessary to increase the temperature of the core area of the optical fuse to more than 1000K in order to cause the fiber fuse phenomenon. Therefore, the fiber-type optical fuse of this example is effective in the case where the optical power for normal operation is W level; however, it is difficult for it to perform operation to several mW level in principle.

Further, since the fiber-type optical fuse performs irreversible operation due to involvement of fiber fusion, it needs to be replaced by a new one after operation.

Also in the case of the fiber-type optical fuses disclosed in JPA-11-281842 and JPA-11-274547, the operation optical power is W level since they utilize heat destruction or heat deterioration of a heat-sensitive layer and a film body due to heat generation. Further, since the fiber-type optical fuses perform irreversible operation in principle, they need to be replaced by new ones after operation. Further, in the fiber-type optical fuses disclosed in U.S. Patent Application Publication No. 20020141021 A1 and JPA-11-281842 and JPA-11-274547, it takes time for the fiber fusion or time from the detection of heat by the heat-sensitive layer and film body to the destruction of the heat-sensitive layer and film body. Therefore, when an optical surge pulse as short as several milliseconds is generated, this optical surge pulse may be output to an optical transmission path due to response delay.

In view of the above problems of the prior arts, an object of the present invention is to provide a light control apparatus such as an optical fuse and the like, capable of controlling an optical power to be input to a next stage optical device to an adequate level or cutting-off an high power input light such as an optical surge at a high response speed and capable of achieving low power consumption and size reduction with a comparatively simple structure.

Means for Solving the Problem

According to an aspect of the present invention, there is provided a light control apparatus comprising: a splitting means for splitting an input signal light to obtain a monitor light which is a part of the input light; a photoelectric conversion means for converting the obtained monitor light into an electric signal; and cutoff means for cutting off an optical transmission path for transmitting the input light by receiving the electric signal as a drive voltage.

Further, according to another aspect of the present invention, there is provided a light control apparatus comprising: transmission and photoelectric conversion means for transmitting an input signal light and converting a part of the input signal light into an electric signal; and opening and closing degree control means for changing the opening and closing degree of an optical transmission path for transmitting the input signal light by receiving the electric signal as a drive voltage.

Effect of the Invention

In the light control apparatus according to the present invention, the means for converting a monitor light which is a part of an input light into an electric signal is provided, and the electrical signal is directly applied, as a drive voltage, to the means for controlling the opening and closing degree of optical transmission path. With this configuration, it is possible to realize a light control apparatus, such as an optical fuse, capable of performing, at high-speed and in a reversible fashion, control or cut off of an optical power to be input to a next stage optical device and capable of achieving low power consumption and size reduction with a comparatively simple structure.

BEST MODE FOR CARRYING OUT THE INVENTION

FIG. 1 is a block diagram of a light control apparatus showing a first embodiment of the present invention. The light control apparatus according to the first embodiment includes a part 14 for splitting an input light 17 from an optical fiber 11, a part 15 (photoelectric conversion part) for converting one (monitor light 12) of the split lights into an electrical signal, and a part 16 for controlling opening and closing of optical transmission path for a signal light 13 based on the converted electrical signal. The opening and closing amount of the optical transmission path is controlled based on the amount of the electrical signal which is output from the photoelectric conversion part 15 in accordance with the level of the monitor light 12 and, thereby, the optical power of an output light 18 can be controlled.

When driving the opening and closing of the optical transmission path with a required amount of the electrical signal serving as a threshold, the light control apparatus functions as an optical fuse. FIG. 3 shows characteristics of the optical fuse when the light control apparatus according to the first embodiment functions as an optical fuse. As shown in FIG. 3, when the power of the input light 17 is low, the part 16 for controlling opening and closing of optical transmission path is in an opening state and the output light 18 is output in accordance with the power of the input light; whereas when the power of the input light exceeds a threshold, the part 16 for controlling opening and closing of optical transmission path is switched to a closing state by an electrical signal supplied from the photoelectric conversion part 15 and the output light 18 is cut off.

It is preferable to use a semiconductor photovoltaic device having a photoelectric conversion function, such as one disclosed in JPA-2000-216424, as the photoelectric conversion part 15 for converting the monitor light 12 into an electrical signal. The semiconductor photovoltaic device consists of a PIN semiconductor structure and generates a voltage based on diffusion and polarization of photocarrier (electron or positive hole) which is generated by light absorption, so that it can perform photoelectric conversion without use of an external power source. A PIN-PD is also available as a device having a photoelectric conversion function. However, in principle, the PIN-PD takes out photocarrier as an electrical signal under an applied electric field, so that it requires an external power source. Use of the semiconductor photovoltaic device allows a signal voltage to be generated without a power source and the opening and closing part 16 of optical transmission path to be directly driven.

The monitor light 12, which is one of the split lights, to be directed to the photoelectric conversion part 15 can be regarded as transmission loss from the standpoint of the light control apparatus and optical fuse. Therefore, it is desirable that the above operation be performed with least possible degree of a monitor light power. To that end, it is necessary to increase photoelectric conversion efficiency of the semiconductor photovoltaic device. Accordingly, the two or more semiconductor photovoltaic devices are connected in series to increase a conversion voltage and to thereby increase photoelectric conversion efficiency. This reduces the power of the monitor light, resulting in a reduction of transmission loss.

Further, by using a nipi-type multijunction semiconductor photovoltaic device such as one disclosed in JPA-2000-216424 as the photoelectric conversion part, photoelectric conversion efficiency can be increased.

FIG. 4 is a cross-sectional view of a semiconductor photovoltaic device or semiconductor photovoltaic device having a nipi-type multijunction structure. In the case of the nipi-type multijunction semiconductor photovoltaic device, a PIN junction that generates an output voltage is formed as a multilayered section in which a plurality of PIN junctions are formed on a semiconductor substrate. As shown in FIG. 4, a semiconductor photovoltaic device to which an input light 47 is input includes an N-type cladding layer 42 formed on a semiconductor substrate 41, a light absorption layer 43 having an i-type (in the case of a semiconductor photovoltaic device) or nipi-type (in the case of a nipi-type multijunction semiconductor photovoltaic device) multijunction structure, a P-type cladding layer 44, a P-type electrode 45, and an N-type electrode 46.

An output voltage is controlled by the diffusion potential of the PIN junction in the semiconductor photovoltaic device, so that the band gap energy of a semiconductor that constitutes the PIN junction is involved in the obtained output voltage. In an InGaAs semiconductor used as a light absorbing material at an optical communication waveband, the band gap energy is about 0.75 eV and, accordingly, the upper limit of the voltage generated by using one semiconductor photovoltaic device is at most about 0.75 V. On the other hand, in the semiconductor photovoltaic device having a nipi-type multijunction structure, a PIN-structure is formed as the multi-layered section 43 on a semiconductor substrate as shown in FIG. 4 and, accordingly, the output voltage value is increased by multiplication of the number of repeated cycles of the PIN junctions in principle.

Thus, when multi-layers of ten cycles of the PIN structures are formed in the multi-layered section 43, it is possible to obtain an output voltage of 7.5 V. This increases photoelectric conversion efficiency and, thereby, a desirable voltage value for driving the opening and closing part of optical transmission path can be obtained with less monitor light power.

Further, by connecting two or more semiconductor photovoltaic devices having a nipi-type multijunction structure in series, it is possible to further increase a conversion voltage.

It is preferable to use an optical shutter realized by a micromachine, such as one disclosed in JPA-2003-270559, as the part 16 for controlling opening and closing of optical transmission path according to the embodiment. The micromachine has a feature in a drive section including a minute-sized actuator and, therefore, a drive power is as extremely small as μW level. By applying such an optical shutter realized by a micromachine, it is possible to perform opening and closing operation of an optical transmission path with less monitor light power, resulting in reductions of a required monitor light power and transmission loss. Further, this contributes to a size reduction of a light control apparatus and optical fuse.

Alternatively, it is possible to use, as the part 16 for controlling opening and closing of optical transmission path, an optical device such as an absorption-type modulator or refractive index type modulator as disclosed in JPA-7-15093. In an absorption-type semiconductor modulator, an external electric field is applied to a PIN structure to thereby absorb an incident light with the electric field so as to extinguish the incident light through the Franz-Keldysh effect (in the case where an absorption core layer is a bulk semiconductor layer) or through the Stark effect (in the case where an absorption core layer is a superlattice layer).

In this configuration, when a signal voltage from the semiconductor photovoltaic device is directly applied to the modulator, an output light can be controlled or cut off in accordance with the signal voltage. Also in the refractive index-type modulator, the extinction operation can be performed by using a refractive-index variation caused by an application of an external electric field. Thus, the refractive index modulator can be applied to the light control apparatus and optical fuse apparatus according to the present invention on the same principle as that of the absorption-type modulator. The abovementioned optical device operates at extremely high-speed (several microseconds) and the size of the device is minute, contributing to an increase in operating speed and a reduction in the size of the light control apparatus and optical fuse.

In the light control apparatus according to the embodiment, an offset voltage source can be inserted in series between the photoelectric conversion part 15 and optical transmission path opening and closing part 16. With this configuration, an adequate offset voltage can be applied to a photoelectric conversion voltage and, consequently, a required signal voltage from the semiconductor photovoltaic device can be reduced to reduce the power of the monitor light 12. Therefore, it is possible to further reduce transmission loss in the light control apparatus and optical fuse apparatus. Further, the offset voltage in this case is as low as at most several V, which is sufficiently low as power consumption.

Further, in the light control apparatus according to the embodiment, the photoelectric conversion part 15 and part 16 for controlling opening and closing of optical transmission path of the signal light 13 based on an electrical signal from the photoelectric conversion part 15 can be mounted on a planar optical circuit formed on a Si substrate in an integrated manner. In this case, the part 14 for splitting an input light 17 can be formed as a waveguide structure on the planer circuit. It is preferable that at least two of the part 14 for splitting an input light 17, photoelectric conversion part 15, and part 16 for controlling opening and closing of optical transmission path be mounted on the same planar optical circuit. With this configuration, it is possible to realize a size reduction of the light control apparatus and optical fuse apparatus.

Further, a function of holding the opening and closing degree of an optical transmission path can be added to the light control apparatus according to the embodiment. This function is useful in the case where the light control apparatus is applied as an optical fuse, in which a closing state is held after the optical fuse operation to protect an optical device at the next stage. This function is realized by providing, e.g., a voltage hold means for holding the conversion voltage of the photoelectric conversion part 15. In this case, a conversion voltage applied at the time when a state of the part 16 is switched to a closing state is held. Further, it is preferable to add a function of indicating the opening and closing state to confirm the state of the optical fuse (for example, a Liquid Crystal Display or LED is used to indicate the closing and opening state) from outside and, for example, it is possible to mount a state display function utilizing the held voltage.

FIG. 2 is a block diagram of a light control apparatus according to a second embodiment of the present invention. The light control apparatus according to the embodiment includes a part 24 having both functions of transmitting an input light 27 from an optical fiber and converting a part of input light (monitor light) into an electrical signal and a part 26 for controlling opening and closing of optical transmission path for a signal light 23 based on the converted electrical signal. The opening and closing amount of the part 26 for controlling opening and closing of optical transmission path is directly controlled based on the amount of the electrical signal which is output in accordance with the level of the monitor light and, thereby, the optical power of an output light 28 can be controlled. Since the part that transmits an input light and performs photoelectric conversion can be realized by a single device, the light control apparatus according to the second embodiment can obtain not only the same effect as that of the light control apparatus of the first embodiment but also an effect of further reducing the number of components as compared with the first embodiment.

When driving the opening and closing of the optical transmission path with a required amount of the electrical signal. serving as a threshold, the light control apparatus functions as an optical fuse. The characteristics of the optical fuse are as shown in FIG. 3. That is, when the power of the input light 27 is low, the part 26 for controlling opening and closing of optical transmission path is in an opening state and the output light 28 is output in accordance with the power of the input light; whereas when the power of the input light exceeds a threshold, the part 26 for controlling opening and closing of optical transmission path is switched to a closing state by an electrical signal generated by the function of converting the monitor light into an electrical signal and the output light 28 is cut off.

It is preferable to use, as the photoelectric conversion part 24 for transmitting the input light 27 and converting the light, which is one of the split lights, into an electrical signal, a semiconductor photovoltaic device having a piled structure. or a stack-type semiconductor photovoltaic device having a nipi-type multijunction structure as shown in FIG. 5.

In the semiconductor photovoltaic device having a piled structure or a stack-type semiconductor photovoltaic device having a nipi-type multijunction structure as shown in FIG. 5, an input light 58 enters a light guide layer 52 and, while being guided by the guide layer 52, a part of the input light (a part of a guided light) is coupled (evanescently-coupled) to a photovoltaic region of a PIN absorption layer or an absorption layer 54 having a nipi-type multijunction structure to be absorbed to thereby generate a voltage. The guided light that has not been coupled is output as an outgoing light 59 from the output side. As shown in FIG. 5, the stack-type semiconductor photovoltaic device includes a light guide layer 52 formed on a substrate 51, an N-type cladding layer 53, a light absorption layer 54 having an i-type or nipi-type multijunction structure, a P-type cladding layer 55, a P-type electrode 56, and an N-type electrode 57.

With the above configuration, transmitting of an input light and generation of an electrical signal in the semiconductor photovoltaic can be realized by a single device, reducing components of the light control apparatus more than in the case of the first embodiment. In the case where the stack-type semiconductor photovoltaic device having a nipi-type multijunction structure is used, the output voltage value is increased in accordance with the number of repeated cycles of the PIN junctions, as described above. This increases photoelectric conversion efficiency and, thereby, a desirable voltage value for driving the opening and closing part of optical transmission path can be obtained with less monitor light power. As a result, transmission loss in the light control apparatus can be reduced.

It is possible to use, as the opening and closing part 26 of an optical transmission path, an optical shutter realized by a micromachine or an optical device such as an absorption-type modulator or refractive index-type modulator. As described above, the micromachine has a feature in a drive section including a minute-sized actuator and, therefore, a drive power is as extremely small as μW level. By applying such an optical shutter realized by a micromachine, it is possible to perform opening and closing operation of an optical transmission path with less monitor light power, resulting in reductions of a required monitor light power and transmission loss. Further, the absorption-type modulator or refractive index-type modulator can extinguish a light by using an electric field, and when a signal voltage from the semiconductor photovoltaic device is directly applied to the modulator, an output light can be controlled or cut off at high-speed in accordance with the signal voltage. The above configurations contribute to an increase in operating speed and a reduction in the size of the light control apparatus and optical fuse apparatus.

Also in the light control apparatus according to the embodiment, an offset voltage source can be inserted in series between the photoelectric conversion part 24 and optical transmission path opening and closing part 26. With this configuration, an adequate offset voltage can be applied and, consequently, a required signal voltage from the semiconductor photovoltaic device can be reduced to reduce the power of the monitor light. Therefore, it is possible to further reduce transmission loss in the light control apparatus and optical fuse apparatus.

Further, in the light control apparatus according to the embodiment, the photoelectric conversion part 24 having functions for splitting the input light 27 and converting the light, which is a part of the input light (monitor light), into an electrical signal and part 26 for controlling opening and closing of optical transmission path of the signal light 23 based on an electrical signal from the photoelectric conversion part 24 can be mounted on a planar optical circuit formed on a Si substrate in an integrated manner. This configuration is further advantageous for reducing the size of the light control apparatus and optical fuse apparatus.

Further, also in the light control apparatus according to the embodiment, a function of holding the opening and closing degree of an optical transmission path may be required in some cases. This function is useful in the case where the light control apparatus is applied as an optical fuse, in which a closing state is held after the optical fuse operation to protect an optical apparatus at the next stage. Further, it is preferable to add a function of indicating the opening and closing state to confirm the state of the optical fuse from outside and, for example, it is useful to mount a state display function utilizing the held voltage.

EXAMPLE 1

FIG. 6 is a plan view showing an example in which the light control apparatus according to the first embodiment is embodied as an optical fuse apparatus (optical fuse operating power: 10 mW).

In the present example, an input light 67 passing through an optical fiber 61 and entering the light control apparatus is split by a beam splitter 64 (signal light:monitor light=9:1). The monitor light 62 enters a semiconductor photovoltaic device 65 that may include a nipi-type multifunction structure. The signal light 63 passes through a micromachine (optical shutter) 66 and is output as an output light 68. The semiconductor photovoltaic device 65 generates a signal voltage in accordance with the level of the monitor light 62 and directly supplies it to the micromachine (optical shutter) 66.

When a high power input light enters, a signal voltage with a value more than that of the drive voltage of the micromachine (optical shutter) 66 is applied to a drive section of the micromachine (optical shutter) 66 to drive the optical shutter to a closing state, thereby enabling optical fuse operation. In the example, an electrostatic actuator-type micromachine having an operating voltage of 5 V is used as the micromachine (optical shutter) 66. Accordingly, it is required to use the semiconductor photovoltaic device to provide an output voltage of 5 V. This requirement can easily be satisfied by using a semiconductor photovoltaic device having a nipi-type multifunction structure in which a voltage value corresponding to the number of multilayers of its PIN structure can be obtained.

More specifically, in the example, a semiconductor photovoltaic device 65 having a nipi-type multijunction structure was used, in which ten stacking cycles of the PIN structures that includes, as one stacking cycle, p-type InGaAs with a thickness of 10 nm ($p=1\times10^{18}$ cm$^{-3}$), i-type InGaAs with a thickness of 50 nm, and n-type InGaAs with a thickness of 10 nm ($n=1\times10^{18}$ cm$^{-3}$) are stacked. In this device, an output voltage of 5 V was obtained when the monitor light 62 was 1 mW. When an input light of 10 mW was input in this configuration, 1 mW was split as the monitor light, and a voltage of 5 V was generated by the semiconductor photovoltaic device to drive the micromachine (optical shutter) to enable optical fuse operation.

It is possible to easily change the input power which is caused the optical fuse operation by design. More specifically, it is possible to control the input power by adjusting the split ratio of the beam splitter 64 or photoelectric conversion rate of the semiconductor photovoltaic device 65. In the case where a surge light of W-level is applied, the sprit ratio of the monitor light side can be made extremely small, thereby significantly reducing transmission loss in the light control apparatus.

Further, by connecting a 2V offset power source in series between the semiconductor photovoltaic device 65 and micromachine (optical shutter) 66, the optical fuse operation can be realized with a signal voltage corresponding to the monitor light of 0.5 mW. This allows the split ratio of the beam splitter 64 to be (signal light:monitor light=9.5:0.5). As a result, transmission loss in the light control apparatus could be reduced from 10% to 5%.

EXAMPLE 2

FIG. 7 is a plan view showing another example in which the light control apparatus according to the first embodiment is embodied as an optical fuse apparatus (optical fuse operating power: 10 mW).

In the present example, an input light 77 passing through an optical fiber 71 and entering the light control apparatus is split by a beam splitter 74 (signal light:monitor light=9:1). The monitor light 72 enters a semiconductor photovoltaic device 75 that may include a nipi-type multifunction structure. The signal light 73 passes through an absorption-type semiconductor modulator 76 and is output as an output light 78. The semiconductor photovoltaic device 75 generates a signal voltage in accordance with the level of the monitor light and directly supplies it to the absorption-type semiconductor modulator 76. When a high power input light enters, a signal voltage with a value more than that of the extinction voltage of the absorption-type semiconductor modulator 76 is applied to drive the absorption-type semiconductor modulator 76 to a closing state, thereby enabling optical fuse operation.

In the example, an absorption-type semiconductor modulator 76 having an extinction voltage of 3V is used. Accordingly, it is required to use the semiconductor photovoltaic device to provide an output voltage of 3V. This requirement can easily be satisfied by using a semiconductor photovoltaic device having a nipi-type multifunction structure in which a voltage value corresponding to the number of multilayers of its PIN structure can be obtained. More specifically, in the Example, a semiconductor photovoltaic device 75 having a nipi-type multifunction structure was used, in which five stacking cycles of the PIN structures that includes, as one stacking cycle, p-type InGaAs with a thickness of 10 nm ($p=1\times10^{18}$ cm$^{-3}$), i-type InGaAs with a thickness of 50 nm, and n-type InGaAs with a thickness of 10 nm ($n=1\times10^{18}$ cm$^{-3}$) are stacked.

In this device, an output voltage of 3V was obtained when the monitor light 72 was 1 mW. When an input light of 10 mW was input in this configuration, 1 mW was split as the monitor light, and a voltage of 3V was generated by the semiconductor photovoltaic device to allow the absorption-type semiconductor modulator 76 to extinguish a light to thereby realize optical fuse operation. It is possible to easily change the input power which is caused the optical fuse operation by design. More specifically, it is possible to control the input power by adjusting the split ratio of the beam splitter 74 or photoelectric conversion rate of the semiconductor photovoltaic device or semiconductor photovoltaic device 75 having a nipi-type multijunction structure.

Further, also in the example, by connecting a 2V offset power source in series between the semiconductor photovoltaic device 75 and absorption-type semiconductor modulator 76, the optical fuse operation can be realized with the monitor light of 0.1 mW. This allows the split ratio of the beam splitter 74 to be (signal light:monitor light =9.9:0.1). As a result, transmission loss in the light control apparatus could be reduced from 10% to 1%.

EXAMPLE 3

FIG. 8 is a plan view showing an example in which the light control apparatus according to the first embodiment is embodied as an optical fuse apparatus (optical fuse operating power: 10 mW) and disposed on a Si substrate including a planar optical circuit.

In the present example, an input light 87 passing through an optical fiber 81 and entering the light control apparatus is split by a beam splitting waveguide 84 (signal light:monitor light=9:1). The monitor light 82 enters a semiconductor photovoltaic device 85 that may include a nipi-type multijunction structure mounted on a semiconductor Si substrate 89. The signal light 83 passes through a micromachine (optical shutter) 86 and is output as an output light 88. The semiconductor photovoltaic device 85 generates a signal voltage in accordance with the level of the monitor light 82 and directly supplies it to the micromachine (optical shutter) 86 mounted on the Si substrate 89.

When a high power input light enters, a signal voltage to be converted in the semiconductor photovoltaic device 85, to which monitor light 82 is inputted, is increased. In this case, when a signal voltage with a value more than that of the drive voltage of the micromachine (optical shutter) 86 is applied, the optical shutter is driven to a closing state, thereby enabling optical fuse operation. In the Example, an electrostatic actuator-type micromachine having an operating voltage of 5 V is used as the micromachine (optical shutter) 86. Accordingly, it is required to use the semiconductor photovoltaic device to provide an output voltage of 5 V. This requirement can be satisfied by using a semiconductor photovoltaic device having a nipi-type multifunction structure in which a voltage value corresponding to the number of multilayers of its PIN structure can be obtained.

More specifically, in the example, a semiconductor photovoltaic device 85 having a nipi-type multijunction structure was used, in which ten stacking cycles of the PIN structures that includes, as one stacking cycle, p-type InGaAs with a thickness of 10 nm ($p=1\times10^{18}$ cm$^{-3}$), i-type InGaAs with a thickness of 50 nm, and n-type InGaAs with a thickness of 10 nm ($n=1\times10^{18}$ cm$^{-3}$) are stacked. In this device, an output voltage of 5 V was obtained when the monitor light 82 was 1 mW. When an input light of 10 mW was input in this configuration, 1 mW was split as the monitor light, and a voltage of 5 V was generated by the semiconductor photovoltaic device to drive the micromachine (optical shutter) to enable optical fuse operation.

It is possible to easily change the input power which is caused the optical fuse operation by design. More specifically, it is possible to control the input power by adjusting the split ratio of the beam splitting waveguide 84 or photoelectric conversion rate of the semiconductor photovoltaic device 85. In the case where a surge light of W-level is applied, the split ratio of the monitor light side can be made extremely small, thereby significantly reducing transmission loss in the light control apparatus.

Further, also in the example, by connecting a 2V offset power source in series between the semiconductor photovoltaic device 85 and micromachine (optical shutter) 86, the optical fuse operation can be realized with a signal voltage corresponding to the monitor light of 0.5 mW. This allows the split ratio of the beam splitting waveguide 84 to be (signal light:monitor light=9.5:0.5). As a result, transmission loss in the light control apparatus could be reduced from 10% to 5%. Further, in the example, components are mounted in an integrated manner on the planar optical circuit on the Si substrate, so that the volume of the light control apparatus is reduced to ½ in comparison to that of the light control apparatus of Example 1, realizing further size reduction.

EXAMPLE 4

FIG. 9 is a plan view showing an example in which the light control apparatus according to the second embodiment is embodied as an optical fuse apparatus (optical fuse operating power: 10 mW).

In the present example, an input light 97 passing through an optical fiber 91 and entering the light control apparatus enters a stack-type semiconductor photovoltaic device 95 that may include a nipi-type multifunction structure as an incident light 92. The incident light is then guided inside the stack-type semiconductor photovoltaic device 95. A part of the incident light 92 is coupled (evanescently-coupled) to the photovoltaic region as shown in FIG. 5 to be absorbed by the photovoltaic region to thereby generate a voltage. The guided light that has not been coupled is output as an outgoing light 93 from the output side. The outgoing light 93 passes through a micromachine (optical shutter) 96 and is output as an output light 98.

The stack-type semiconductor photovoltaic device 95 generates a signal voltage in accordance with the level of the absorbed light and directly supplies it to the micromachine (optical shutter) 96.

When a high power input light enters, a signal voltage to be converted in the stack-type semiconductor photovoltaic device 95 is increased. In this case, when a signal voltage with a value more than that of the drive voltage of the micromachine (optical shutter) 96 is applied, the optical shutter is driven to a closing state, thereby enabling optical fuse operation.

In the example, a stack-type semiconductor photovoltaic device which a splitting ratio to the photovoltaic region is 10% is used, and an electrostatic actuator-type micromachine having a drive voltage of 5 V is used as the micromachine (optical shutter) 96. Accordingly, it is required to use the stack-type semiconductor photovoltaic device to provide an output voltage of 5 V. This requirement can easily be satisfied by using a stack-type semiconductor photovoltaic device having a nipi-type multifunction structure in which a voltage value corresponding to the number of multilayers of its PIN structure can be obtained.

More specifically, in the example, a stack-type semiconductor photovoltaic device 95 having a nipi-type multijunction structure was used, in which ten stacking cycles of the PIN structures that includes, as one stacking cycle, p-type InGaAs with a thickness of 10 nm ($p=1 \times 10^{18}$ cm$^{-3}$), i-type InGaAs with a thickness of 50 nm, and n-type InGaAs with a thickness of 10 nm ($n=1 \times 10^{18}$ cm$^{-3}$) are stacked. In this device, an output voltage of 5 V was obtained when the absorbed light was 1 mW. When an input light of 10 mW was input in this configuration, 1 mW is split to the photovoltaic region to generate a voltage of 5 V, thereby driving the micromachine (optical shutter) to enable optical fuse operation.

It is possible to easily change the input power which is caused the optical fuse operation by design. More specifically, it is possible to control the input power by adjusting coupling (evanescent coupling) degree to the photovoltaic region in the stack-type semiconductor photovoltaic device 95 to change the photoelectric conversion rate. Further, by connecting a 2V offset power source in series between the stack-type semiconductor photovoltaic device 95 having a nipi-type multijunction structure and micromachine (optical shutter) 96, it is possible to reduce the light splitting ratio to the semiconductor photovoltaic region for optical fuse operation to 5%. As a result, transmission loss in the light control apparatus could be reduced from 10% to 5%.

Further, in the example, it is possible to cut off the signal light 93 by using an absorption-type modulator or refractive index-type modulator in place of the micromachine (optical shutter) 96.

EXAMPLE 5

FIG. 10 is a plan view showing an example in which the light control apparatus according to the second embodiment is embodied as an optical fuse apparatus (optical fuse operating power: 10 mW) and disposed on a Si substrate including a planar optical circuit.

In the present example, an input light 107 passing through an optical fiber 101 and entering the light control apparatus enters a stack-type semiconductor photovoltaic device 105 that may include a nipi-type multijunction structure mounted on a Si substrate 109 as an incident light 102. The incident light is then guided and a part of the incident light is coupled (evanescently-coupled) to the photovoltaic region as shown in FIG. 5 to be absorbed by the photovoltaic region to thereby generate a photoelectric conversion voltage. The guided light that has not been coupled is output as an outgoing light 103 from the output side. The outgoing light 103 passes through a micromachine (optical shutter) 106 and is output as an output light 108. The stack-type semiconductor photovoltaic device 105 generates a signal voltage in accordance with the level of the absorbed light and directly supplies it to the micromachine (optical shutter) 106 mounted on the Si substrate 109.

When a high power input light enters, a signal voltage to be converted in the stack-type semiconductor photovoltaic device 105 is increased. In this case, when a signal voltage with a value more than that of the drive voltage of the micromachine (optical shutter) 106 is applied, the optical shutter is driven to a closing state, thereby enabling optical fuse operation. In the example, a stack-type semiconductor photovoltaic device which a splitting ratio to the photovoltaic region is 10% is used, and an electrostatic actuator-type micromachine having a drive voltage of 5 V is used as the micromachine (optical shutter) 106. Accordingly, it is required to use the stack-type semiconductor photovoltaic device to provide an output voltage of 5 V.

This requirement can be satisfied by using a stack-type semiconductor photovoltaic device having a nipi-type multifunction structure in which a voltage value corresponding to the number of multilayers of its PIN structure can be obtained. More specifically, in the example, a stack-type semiconductor photovoltaic device 105 having a nipi-type multijunction structure was used, in which ten stacking cycles of the PIN structures that includes, as one stacking cycle, p-type InGaAs with a thickness of 10 nm ($p=1 \times 10^{18}$ cm$^{-3}$), i-type InGaAs with a thickness of 50 nm, and n-type InGaAs with a thickness of 10 nm ($n=1 \times 10^{18}$ cm$^{-3}$) are stacked. In this device, an output voltage of 5 V was obtained when the absorbed light was 1 mW.

When an input light of 10 mW was input in this configuration, 1 mW is split to the photovoltaic region to generate a voltage of 5 V, thereby driving the micromachine (optical shutter) 106 to enable optical fuse operation. It is possible to easily change the input power which is caused the optical fuse operation by design. More specifically, it is possible to control the input power by adjusting coupling (evanescent coupling)

degree to the photovoltaic region in the stack-type semiconductor photovoltaic device 105 to change the photoelectric conversion rate.

Further, also in the example, by connecting a 2V offset power source in series between the stack-type semiconductor photovoltaic device 105 having a nipi-type multijunction structure and micromachine (optical shutter) 106, it is possible to reduce the light splitting ratio to the semiconductor photovoltaic region for optical fuse operation to 5%. As a result, transmission loss in the light control apparatus could be reduced from 10% to 5%. Further, it is possible to cut off the signal light 103 by using an absorption-type modulator or refractive index-type modulator in place of the micromachine (optical shutter) 106. Further, in the example, components are mounted in an integrated manner on the planar optical circuit on the Si substrate, so that the volume of the light control apparatus is reduced to ⅔ in comparison to that of the light control apparatus of Example 4, realizing further size reduction.

As described above, according to the above embodiments of the present invention, a light control apparatus that is capable of performing, at high-speed and in a reversible fashion, control or cutoff of an optical power to be input to a next stage optical apparatus, that is configured to be "small", "using no power source", "low power consumption", "low loss" and the like with a comparatively simple structure, and that is capable of being directly connected to an optical communication apparatus or optical measurement apparatus using an optical fiber can be realized.

INDUSTRIAL APPLICABILITY

The present invention is applicable to a light control apparatus for use in protection from a surge light or high power input light.

EXPLANATION OF REFERENCE NUMERALS

Figure 1:
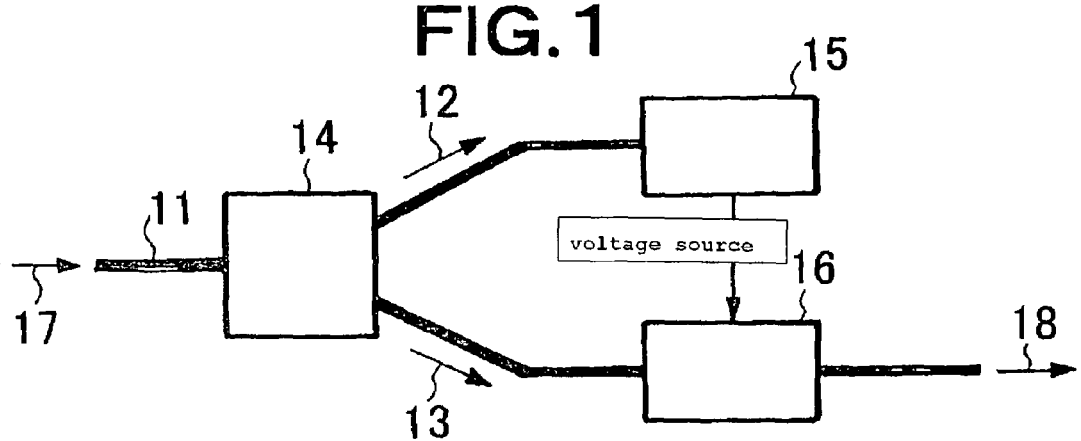
FIG. 1 is a block diagram of a light control apparatus showing a first embodiment of the present invention.
Figure 2:
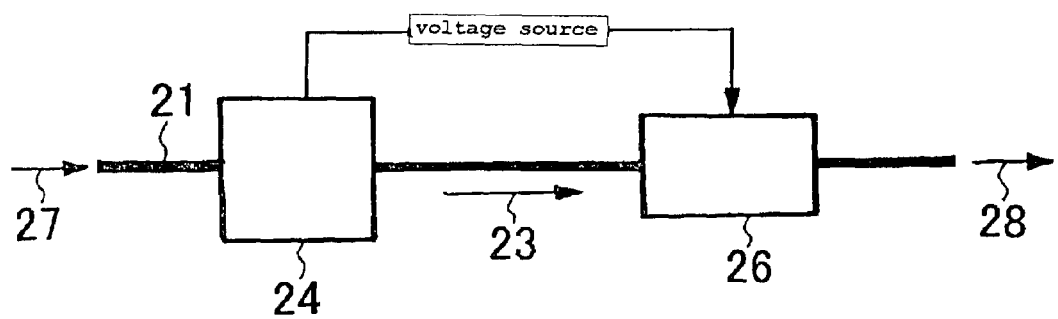
FIG. 2 is a block diagram of a light control apparatus according to a second embodiment of the present invention.
Figure 3:
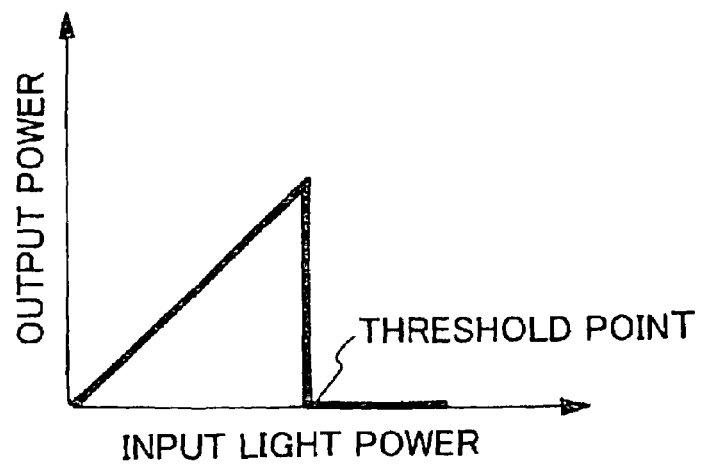
FIG. 3 is a view showing characteristics of the optical fuse according to the present invention.
Figure 4:
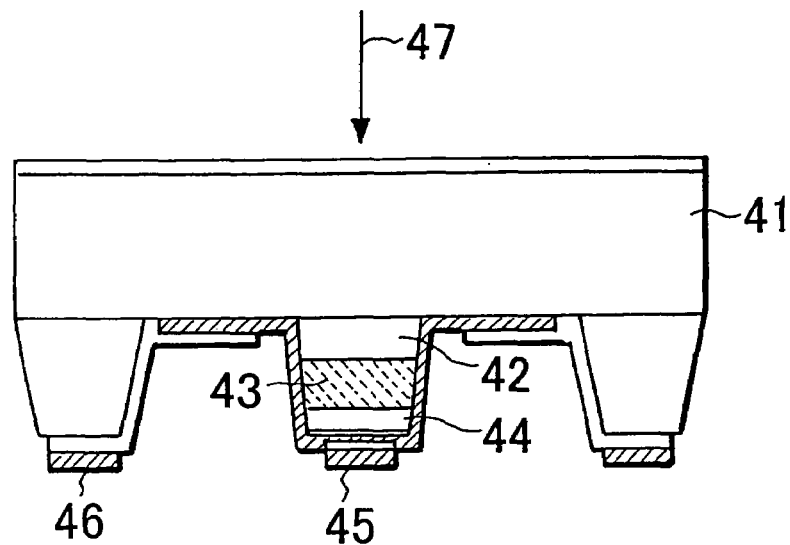
FIG. 4 is a cross-sectional view of a semiconductor photovoltaic device or semiconductor photovoltaic device having a nipi-type multifunction structure used in the light control apparatus according to the first embodiment.
Figure 5:
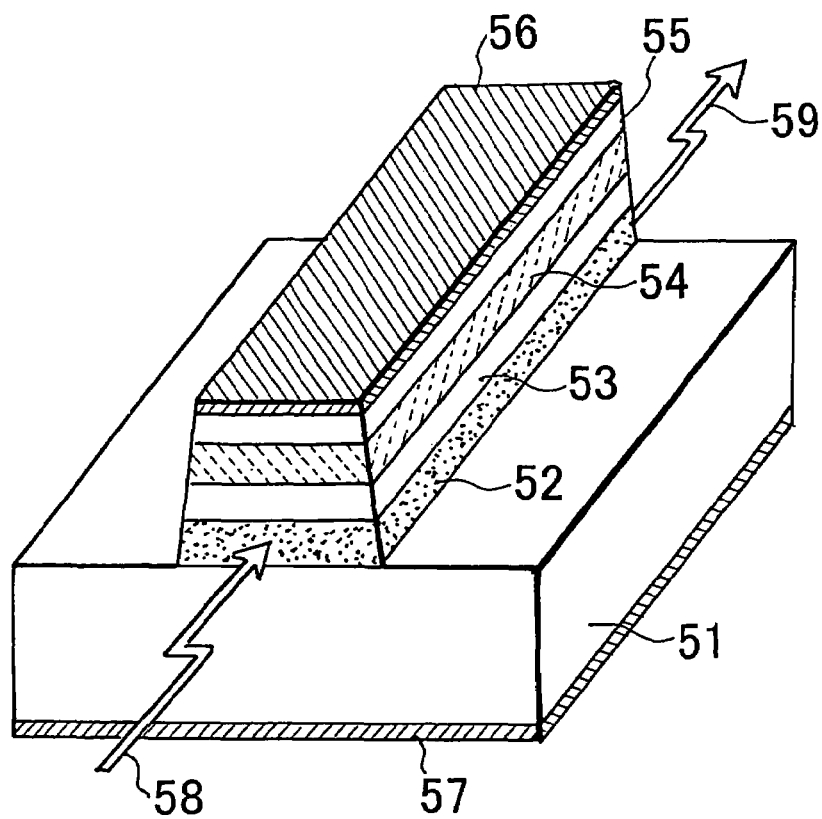
FIG. 5 is a perspective view of a semiconductor photovoltaic device having a piled structure or a stack-type semiconductor photovoltaic device having a nipi-type multifunction structure used in the light control apparatus according to the second embodiment.
Figure 6:
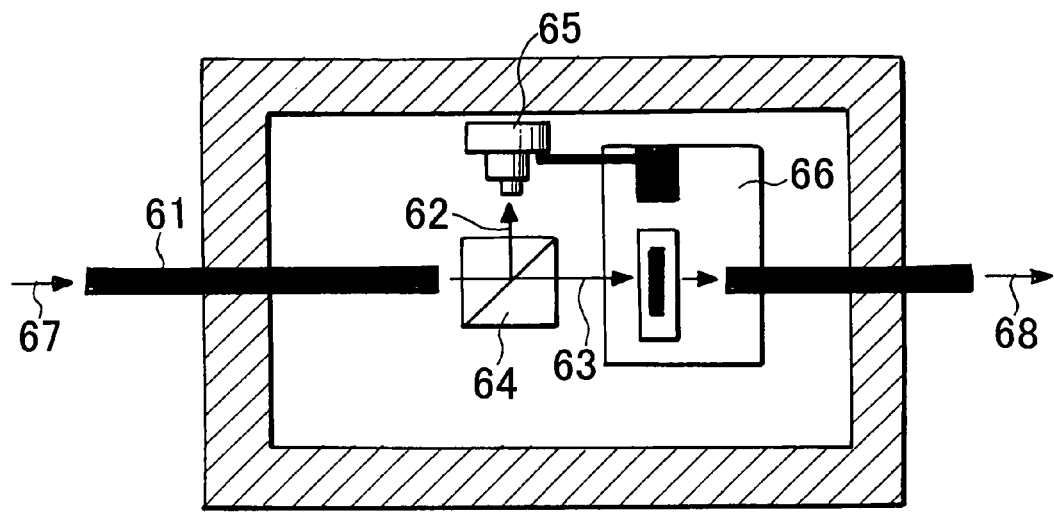
FIG. 6 is a plan view showing Example 1 in which the light control apparatus according to the first embodiment is embodied.
Figure 7:
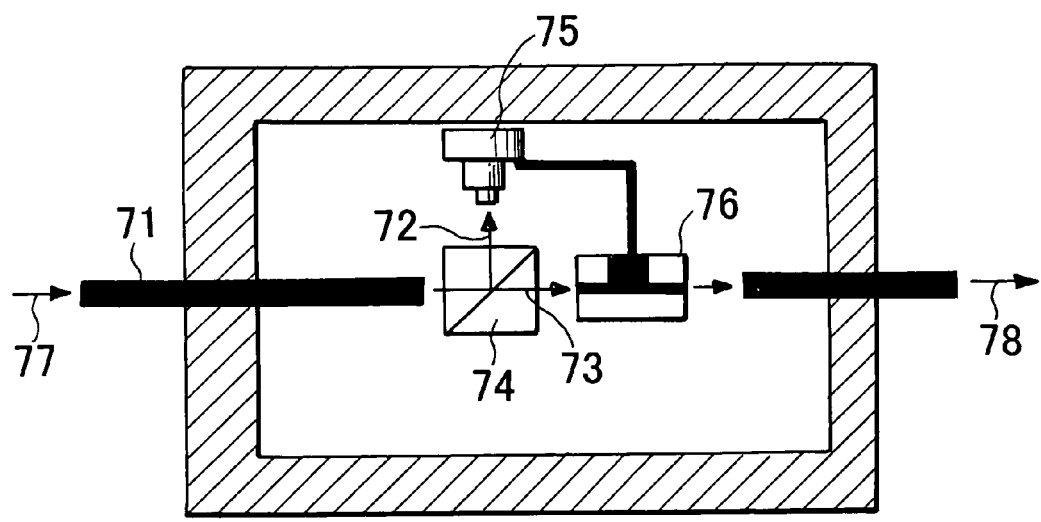
FIG. 7 is a plan view showing Example 2 in which the light control apparatus according to the first embodiment is embodied.
Figure 8:
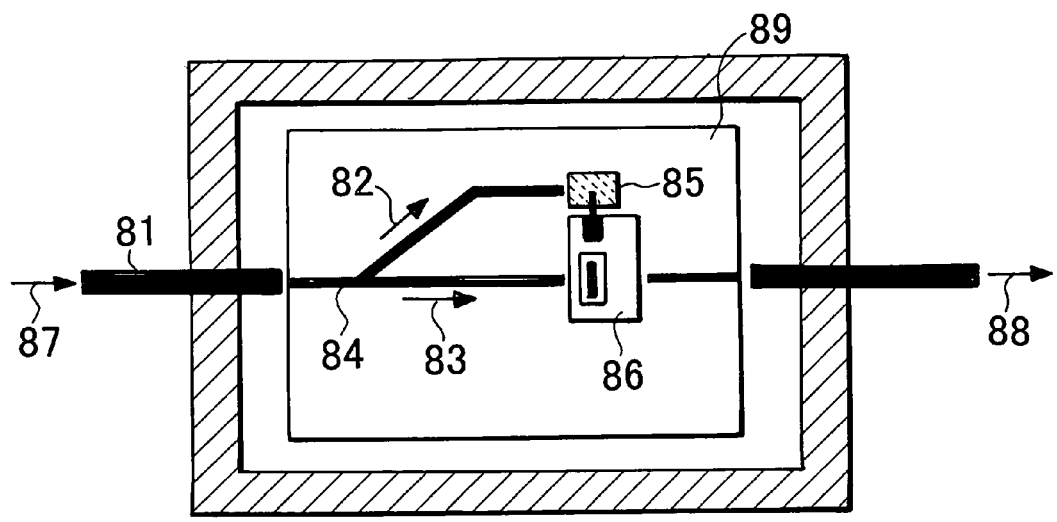
FIG. 8 is a plan view showing Example 3 in which the light control apparatus according to the first embodiment is embodied.
Figure 9:
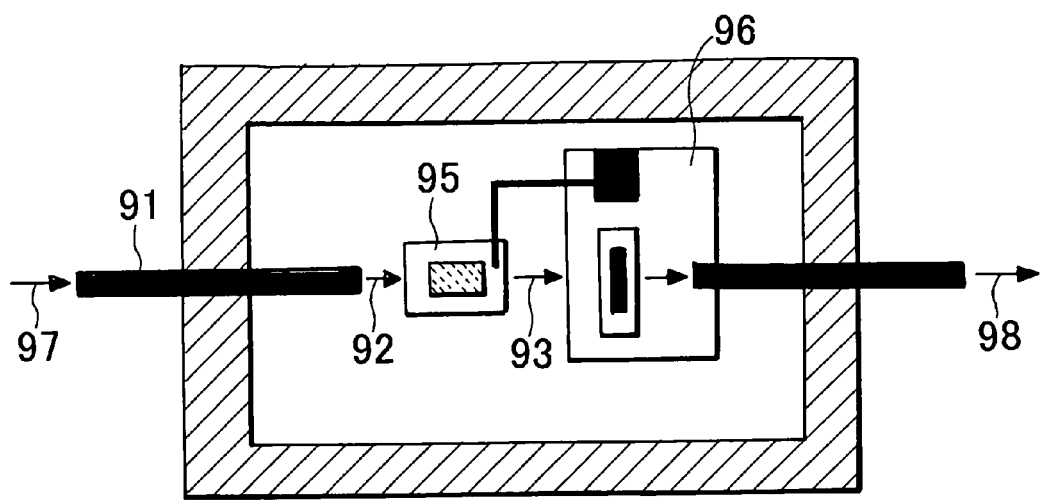
FIG. 9 is a plan view showing Example 4 in which the light control apparatus according to the second embodiment is embodied.
Figure 10:
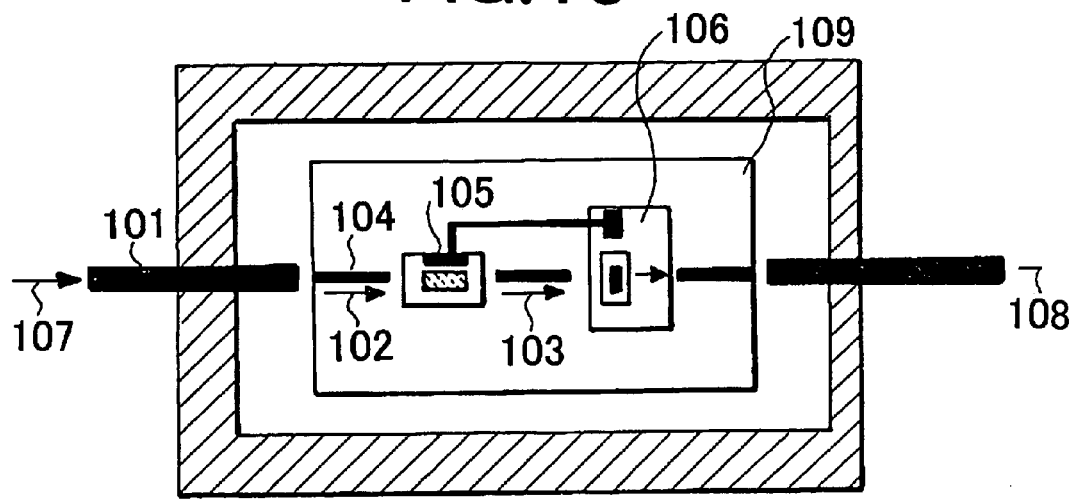
FIG. 10 is a plan view showing Example 5 in which the light control apparatus according to the second embodiment is embodied.
Figure 11:
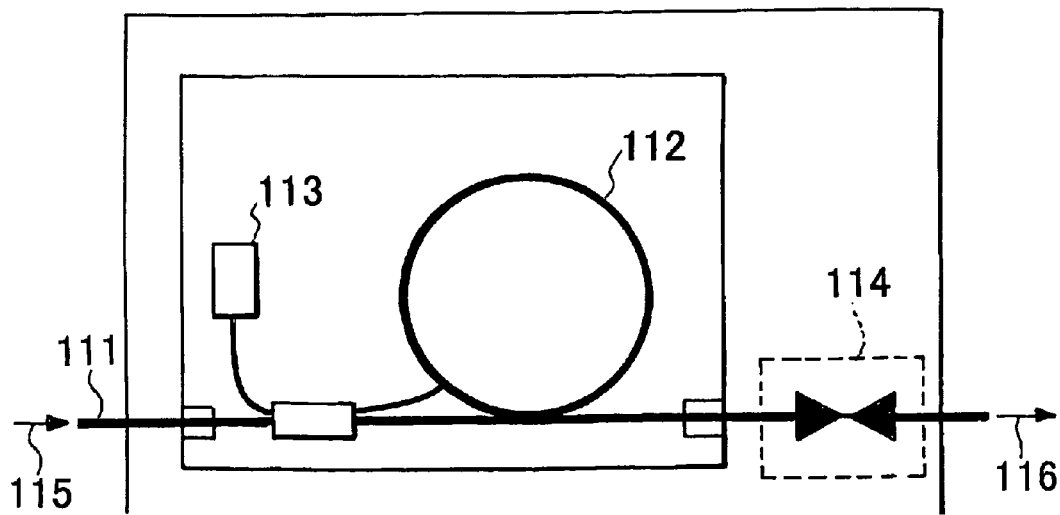
FIG. 11 is a view showing a conventional light control apparatus.
Figure 12:
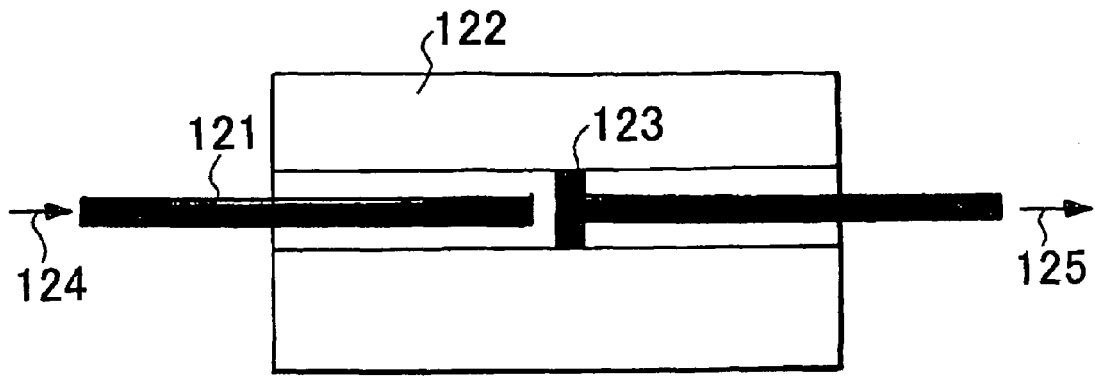
FIG. 12 is a view showing another conventional light control apparatus.
Figure 13:
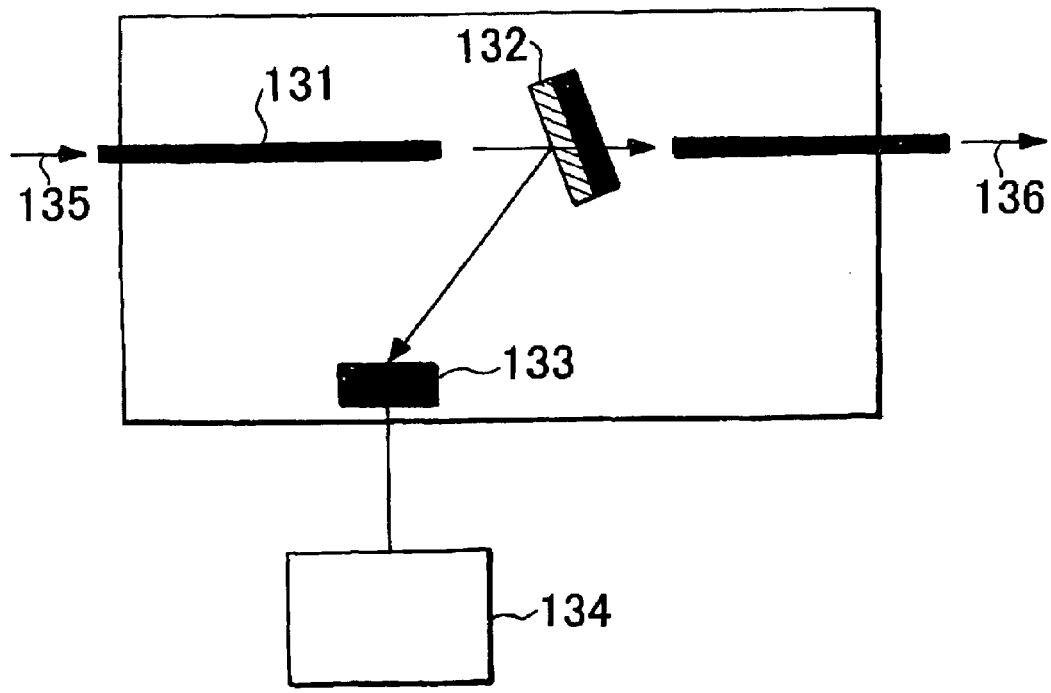
FIG. 13 is a view showing still another conventional light control apparatus.

11, 21, 61, 71, 81, 91, 101, 111, 121, 131, 141: Optical fiber
12, 47, 62, 72, 82: Monitor light
13, 23, 63, 73, 83: Signal light
14: Part for splitting input light
15: Photoelectric conversion part
16, 26: Part for opening and closing optical transmission path
17, 27, 58, 67, 77, 87, 97, 107, 115, 124, 135, 147: Input light
18, 28, 59, 68, 78, 88, 98, 108, 116, 125, 136, 148: Output light
24: Part for splitting input light and performing photoelectric conversion
41: Semiconductor substrate
42, 53: N-type cladding layer
43, 54: Light absorption layer having i-type or nipi-type multijunction structure
44, 55: P-type cladding layer
45, 56: P-type electrode
46, 57: N-type electrode
51: Substrate
52: Light guide layer
64, 74: Beam splitter
65, 75, 85: Semiconductor photovoltaic device or semiconductor photovoltaic device having nipi-type multifunction structure
66, 86, 96, 106: Micromachine (optical shutter)
76: Absorption-type semiconductor modulator
84: Beam splitting waveguide
89, 109: Planar circuit mounted Si substrate
92, 102: Incident light
93, 103: Outgoing light
95, 105: Stack-type semiconductor photovoltaic device or stack-type semiconductor photovoltaic device having nipi-type multifunction structure
104: Waveguide
112: Optical fiber amplifier
113: Excitation light source
114: Tapered-type optical fiber
122: Chassis
123: Medium comprising heat-sensitive and heat-altered material, and light-absorbing and heat-generating material
132: Film body
133, 134: Monitor device (PIN-PD)
134, 146: Power source and determination circuit
142: Split light for monitor
143: Part for splitting light
145: Mechanical shutter

The invention claimed is:
1. A light control apparatus comprising:
a splitting device for splitting an input signal light to obtain a monitor light which is a part of the input light;
a photoelectric conversion device for converting the obtained monitor light into an electric signal; and an opening and closing device that closes the optical transmission path by receiving the electric signal as a drive voltage so that the output light is cut off when the input light exceeds a threshold,
wherein said photoelectric conversion device is one or more semiconductor photovoltaic device.

2. The light control apparatus according to claim 1, wherein said one or more semiconductor photovoltaic device has a nipi-type multijunction structure.

3. The light control apparatus according to claim 1, wherein said opening and closing device is an optical shutter using a micromachine.

4. The light control apparatus according to claim 1, wherein said opening and closing device is an optical device comprising one of an absorption-type modulator and a refractive index-type modulator.

5. The light control apparatus according to claim 1, wherein a voltage source is inserted between said photoelectric conversion device and said opening and closing device.

6. The light control apparatus according to claim 1, wherein at least two of said splitting device, said photoelectric conversion device, and said opening and closing device are disposed on a single planar optical circuit.

7. The light control apparatus according to claim 1, wherein said opening and closing device comprises a device for holding an opened and closed state controlled based on the electrical signal and a device for indicating the held opened and closed state.

8. A light control apparatus comprising:
a transmission and photoelectric conversion device for transmitting an input signal light and converting a part of the input signal light into an electric signal; and
an opening and closing degree control device for changing the opening and closing degree of an optical transmission path for transmitting the input signal light by receiving the electric signal as a drive voltage,
wherein said transmission and photoelectric conversion device is a semiconductor photovoltaic device having a stack-type structure.

9. The light control apparatus according to claim 8, wherein said semiconductor photovoltaic device has a nipi-type multijunction structure.

10. The light control apparatus according to claim 8, wherein said opening and closing degree control device is an optical shutter using a micromachine.

11. The light control apparatus according to claim 8, wherein said opening and closing degree control device is an optical device such as an absorption-type modulator or refractive index-type modulator.

12. The light control apparatus according to claim 8, wherein a voltage source is inserted between said transmission and photoelectric conversion device and said opening and closing degree control device.

13. The light control apparatus according to claim 8, wherein said transmission and photoelectric conversion device and opening and closing degree control device are disposed on a single planar optical circuit.

14. The light control apparatus according to claim 8, wherein said opening and closing degree control device comprises a device for holding an opened and closed state controlled based on the electrical signal and a device for indicating the held opened and closed state.

15. The light control apparatus according to claim 8, wherein said semiconductor photovoltaic device has a waveguide structure.

16. A light control apparatus comprising:
a transmission and photoelectric conversion device for transmitting an input signal light and converting a part of the input signal light into an electric signal; and
a cutoff device for cutting off an optical transmission path for transmitting the input signal light by receiving the electric signal as a drive voltage,
wherein said transmission and photoelectric conversion device is a semiconductor photovoltaic device having a stack-type structure.

* * * * *